P. D. SKAHEN.
PULLEY.
APPLICATION FILED SEPT. 6, 1907.

928,338.

Patented July 20, 1909.
2 SHEETS—SHEET 1.

Witnesses
J. G. Hinkel
J. J. McCarthy

Inventor
Patrick D. Skahen
By Foster Freeman Watson
Attorneys

P. D. SKAHEN.
PULLEY.
APPLICATION FILED SEPT. 6, 1907.

928,338.

Patented July 20, 1909.
2 SHEETS—SHEET 2.

Witnesses
J. G. Hinkel
J. J. McCarthy

Inventor
Patrick D. Skahen
By Foster Freeman Watson Coit
Attorneys

UNITED STATES PATENT OFFICE.

PATRICK D. SKAHEN, OF SYRACUSE, NEW YORK.

PULLEY.

No. 928,338.

Specification of Letters Patent.

Patented July 20, 1909.

Application filed September 6, 1907. Serial No. 391,651.

*To all whom it may concern:*

Be it known that I, PATRICK D. SKAHEN, a citizen of the United States, and resident of Syracuse, Onondaga county, State of New York, have invented certain new and useful Improvements in Pulleys, of which the following is a specification.

This invention relates to improvements in metal pulleys and more especially to pulleys constructed of sheet metal parts properly stamped or pressed into shape and suitably connected together, and it is in the nature of an improvement upon the pulley patented to me July 9th, 1907, by Letters-Patent 859,849.

Figure 1:
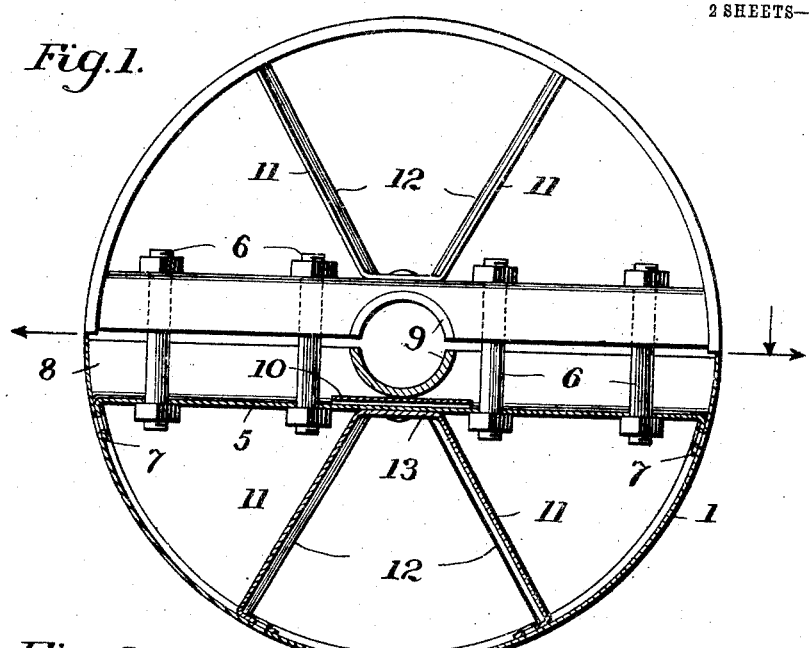
Figure 2:
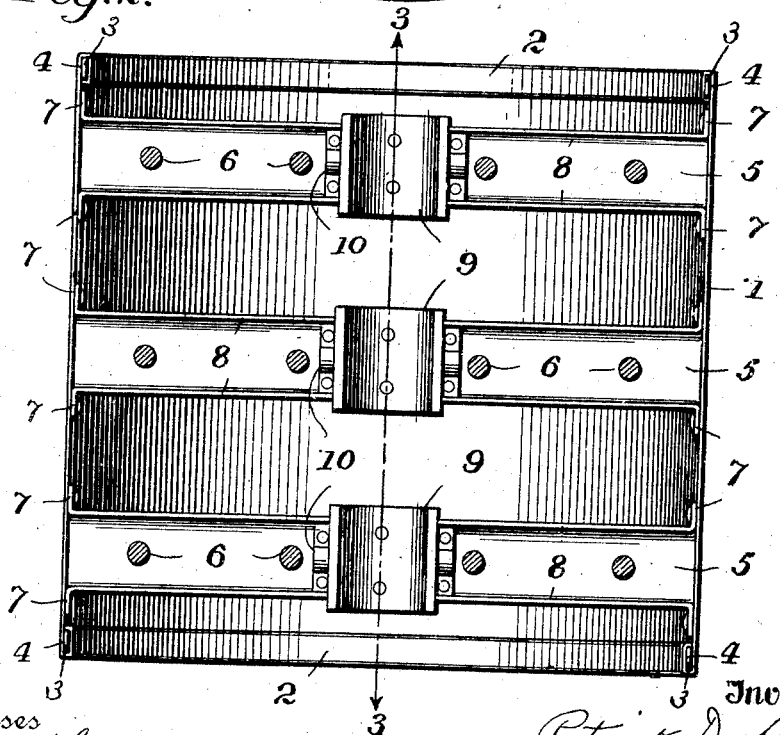
Figure 3:
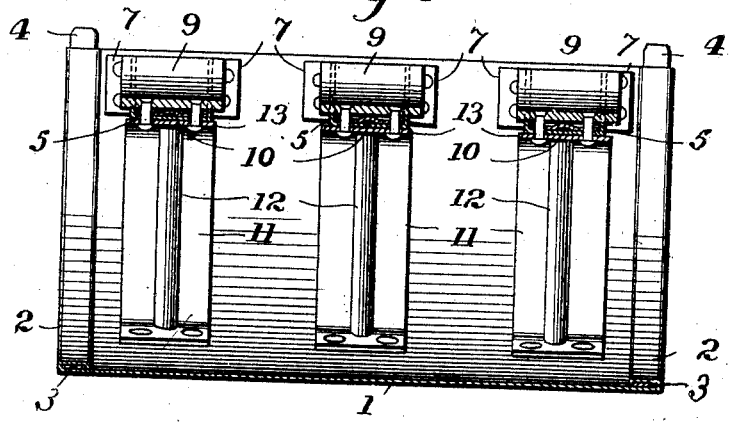

The invention will be described in connection with the accompanying drawing, in which, Figure 1 is a side elevation partly in section of a pulley embodying the invention; Fig. 2 is a plan view of one-half of the pulley shown in Fig. 1; Fig. 3 is a section on the line 3—3 of Fig. 2.

My improved pulley is constructed in two semi-circular sections which are alike excepting that they are preferably provided with interlocking parts which hold them in register when assembled.

Referring to the drawings, each half of the pulley comprises a semi-circular rim portion 1 which has a tubular bead 2 at each end formed by bending the sheet metal about a bar or rod 3. These bars or rods are arranged to protrude on one section, forming tongues 4 which enter recesses in the beads on the other section of the pulley and thus assist in causing the sections of the pulley to register when assembled. Each half of the pulley is provided with a plurality of spoke sections 5, arranged diametrically and connecting its ends, and each of these spoke sections is U-shaped in cross-section and provided with holes for bolts 6 which are used to connect the two halves of the pulley, as illustrated in Fig. 1. The spoke sections 5 are provided with flanges 7 at their ends which are riveted or otherwise suitably connected with the rim. These flanges may be turned outward and downward, as illustrated. Each of the spoke sections 5 has its side flanges 8 cut away to form seats for a hub section 9 and an auxiliary flat plate 10 is also preferably interposed between the bottom of the spoke section and the hub section to give additional support to the hub said plate being suitably secured to the spoke section. To brace and stiffen each half of the pulley, I connect each of the spoke sections 5 with the rim by means of two auxiliary spokes or braces 11, which are preferably constructed of a single piece of sheet metal having stiffening ribs 12 stamped therein. The intermediate portion 13 of the auxiliary spokes is connected by means of suitable rivets with adjacent hub section 9, which rivets pass through the spoke section 5 and the auxiliary plate 10. The outer ends of the spokes 12 are flanged and connected to the rim, as clearly shown in the drawing.

I propose to make pulleys of any width and to provide them with a suitable plurality of sets of spokes, and I preferably provide each set of spokes with a separate hub section constructed and connected as illustrated. The pulley herein described is substantially as simple and cheap to construct as that illustrated in my patent above referred to and I have found it more rigid and serviceable.

It will be evident that the construction and arrangement of parts may be more or less varied without departing from the spirit and scope of the invention and hence I do not limit myself to the exact construction herein illustrated and described.

What I claim and desire to secure by Letters-Patent, is,

A sheet metal pulley consisting of two semi-circular sections, each section having a semi-cylindrical rim, a diametrically arranged spoke of channel-section, the side flanges of said spoke recessed at the center, a semi-circular hub section seated in said recesses, an auxiliary flat plate fitted between the flanges of the spoke between the latter and the hub section, and a pair of auxiliary spokes consisting of a single piece, the ends connected to the rim and the central portion extending to the center of the main spoke, and rivets passing through the said central portion of the auxiliary spokes and through the diametric spoke, auxiliary plate and hub section, for the purpose specified.

In testimony whereof I affix my signature in presence of two witnesses.

PATRICK D. SKAHEN.

Witnesses:
LUCIUS E. RIES,
FLODE P. DOANE.